US006681327B1

(12) United States Patent
Jardin

(10) Patent No.: US 6,681,327 B1
(45) Date of Patent: Jan. 20, 2004

(54) METHOD AND SYSTEM FOR MANAGING SECURE CLIENT-SERVER TRANSACTIONS

(75) Inventor: Cary A. Jardin, San Diego, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/345,575

(22) Filed: Jun. 30, 1999

Related U.S. Application Data

(63) Continuation-in-part of application No. 09/054,304, filed on Apr. 2, 1998.
(60) Provisional application No. 60/133,451, filed on May 11, 1999.

(51) Int. Cl.⁷ .............................. H04L 9/00; H04L 12/22
(52) U.S. Cl. ...................................... 713/153; 713/201
(58) Field of Search ......................................... 713/153

(56) References Cited

U.S. PATENT DOCUMENTS

| | | | | |
|---|---|---|---|---|
| 4,823,122 A | | 4/1989 | Mann et al. ............ 340/825.28 |
| 5,136,716 A | | 8/1992 | Harvey et al. ............... 395/800 |
| 5,329,619 A | | 7/1994 | Page et al. ................... 395/200 |
| 5,341,477 A | | 8/1994 | Pitkin et al. ................. 395/200 |
| 5,371,852 A | | 12/1994 | Attanasio et al. ........... 395/200 |
| 5,434,852 A | | 7/1995 | La Porta et al. ........... 370/58.2 |
| 5,444,782 A | * | 8/1995 | Adams et al. ............... 713/153 |
| 5,446,896 A | | 8/1995 | Hegarty et al. ............. 395/650 |
| 5,475,819 A | | 12/1995 | Miller et al. ........... 395/200.03 |
| 5,506,984 A | | 4/1996 | Miller ......................... 395/600 |
| 5,530,758 A | * | 6/1996 | Marino et al. .............. 713/150 |
| 5,544,320 A | | 8/1996 | Konrad ................... 395/200.09 |
| 5,548,726 A | | 8/1996 | Pettus .................... 395/200.09 |
| 5,708,780 A | | 1/1998 | Levergood et al. .... 395/200.12 |
| 5,708,832 A | | 1/1998 | Inniss et al. ................. 395/800 |
| 5,748,897 A | | 5/1998 | Katiyar .................. 395/200.49 |
| 5,751,971 A | | 5/1998 | Dobbins et al. ....... 395/200.68 |
| 5,757,924 A | * | 5/1998 | Friedman et al. ........... 713/151 |
| 5,774,660 A | | 6/1998 | Brendel et al. ........ 395/200.31 |
| 5,812,768 A | | 9/1998 | Pagéee et al. |
| 5,819,020 A | * | 10/1998 | Beeler, Jr. ....................... 714/5 |
| 5,822,563 A | | 10/1998 | Sitbon et al. ................ 395/500 |
| 5,828,847 A | | 10/1998 | Gehr et al. ............ 395/200.69 |
| 5,854,841 A | * | 12/1998 | Nakata et al. ............... 713/152 |
| 5,903,724 A | * | 5/1999 | Takamoto et al. ........... 709/200 |
| 5,987,140 A | * | 11/1999 | Rowney et al. ................ 705/79 |

FOREIGN PATENT DOCUMENTS

| | | | |
|---|---|---|---|
| EP | 0 865 180 A2 | 9/1998 | ........... H04L/12/56 |
| EP | 0872990 | 10/1998 | |

OTHER PUBLICATIONS

Richard M. Adler, "Distributed Coordination Models for Client/Server Computing", Computer, vol 28, No. 4, pps. 14–22, Apr. 1995.

E. Anderson, et al., "The Magicrouter, An Application of Fast Packet Interposing", May 1996, pps. 1–12.

* cited by examiner

*Primary Examiner*—Gilberto Barrón
*Assistant Examiner*—Benjamin E. Lanier
(74) *Attorney, Agent, or Firm*—Kenyon & Kenyon

(57) ABSTRACT

A server broker configured for use in a secure communication network, such as the Internet. The broker is configured to broker client transactions received over a secure network link, such as a secure socket layer (SSL) link, for distribution among one or more of a plurality of fulfillment servers. In one embodiment, the broker establishes a non-secure link with the one or more fulfillment servers. In another embodiment, the broker establishes a secure SSL link with the one or more fulfillment servers. The fulfillment server executes client transactions and sends response packets for delivery to the client.

43 Claims, 4 Drawing Sheets

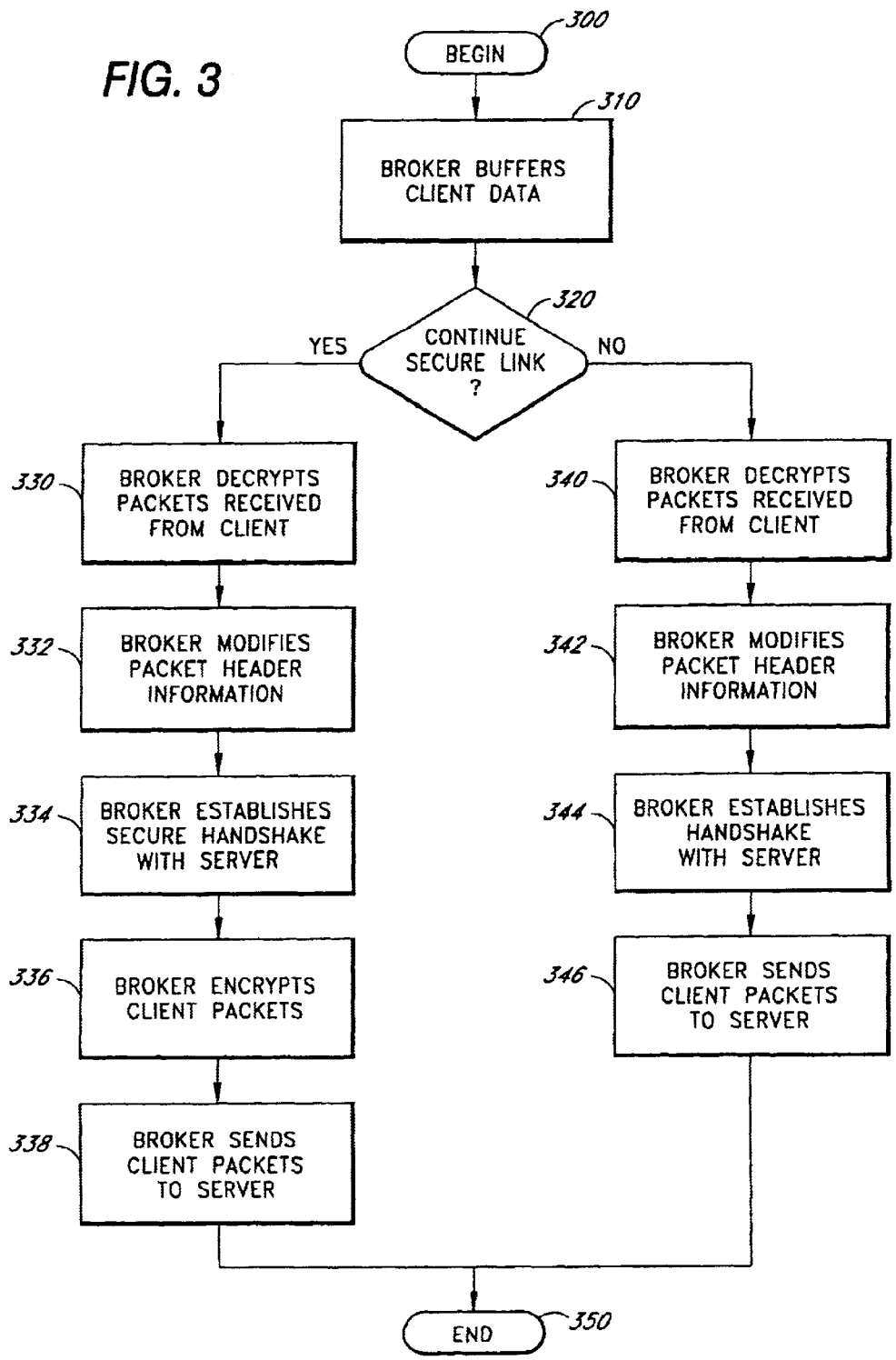

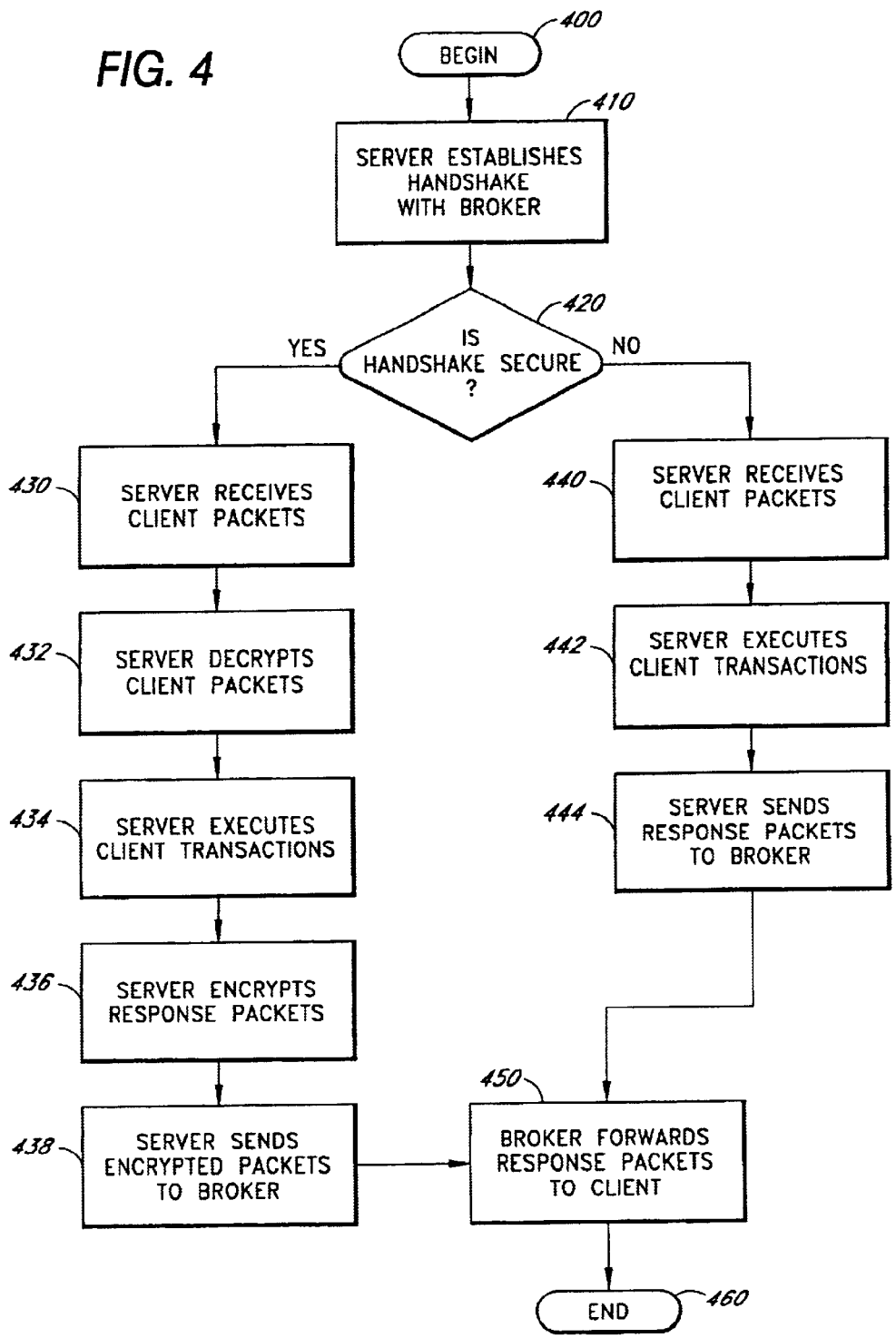

METHOD AND SYSTEM FOR MANAGING SECURE CLIENT-SERVER TRANSACTIONS

RELATED APPLICATIONS

This application claims priority from a provisional patent application titled "METHOD AND SYSTEM FOR MANAGING SECURE CLIENT-SERVER TRANSACTIONS," having application Ser. No. 60/133451, and filed on May 11, 1999. This application is also a continuation-impart of a U.S. patent application titled "SYSTEM AND METHOD FOR MANAGING CLIENT REQUESTS IN CLIENT-SERVER NETWORKS", having application Ser. No. 09/054,304, filed on Apr. 2, 1998, (hereinafter "the referenced application").

BACKGROUND OF THE INVENTION

1. Field of the Invention

The invention relates generally to computer networks technology. More particularly, this invention relates to the management of client transactions in secure client-server based networks.

2. Description of the Related Technology

Communication of data over a network, such as the Internet, has become as common as communicating voice over a telephone. The tremendous increase in network communication has been subject to intrusion by unauthorized users, such as computer hackers. To combat these intruders, most communication protocols now implement some form of communication security, which ranges from simple scrambling to very sophisticated encryption algorithms. More particularly, the Transmission Control Protocol (TCP)/Internet Protocol (IP) used by many networks, including the Internet, was adapted to include security protocols such as Secure Socket Layer (SSL) and IP Security (IPsec). The following is a brief description of each of these security protocols.

SSL is a protocol developed for the transmission of private data (e.g., a text document) via the Internet. SSL provides a secure connection to communicate data between a client and a server by using a private key to encrypt the data. Private key/public key encryption is well understood and frequently implemented by modem computer networks to ensure privacy of information being transmitted from a sender computer to a recipient computer. Web browsers, such as Netscape Navigator and Internet Explorer, support SSL, and many Web sites implement the SSL protocol to obtain confidential user information, such as credit card numbers. SSL provides the mechanism to implement authentication and encryption. Authentication ensures that each of the client and server is who it claims to be. In practice, authentication may simply involve entering a user identification (ID) and password. However, a computer hacker may eavesdrop on the client-server link to intercept password and user name information. Encryption deters such mischief by scrambling the user ID and password information before transmission over the network. In addition to encrypting user information, SSL uses encryption to secure nearly every type of data including the payload (i.e., a text document) communicated between the client and server. In effect, SSL provides for encryption of a session, and authentication of a server, message, and optionally a client. For further details on the SSL protocol, reference is made to SSL Protocol Specification, versions 2 and 3, which are incorporated by reference.

SSL is a protocol that protects any level protocol built on protocol sockets, such as telnet, file transfer protocol (FTP), or hypertext transfer protocol (HTTP). As is known in the network technology, a socket is a software object that connects an application to a network protocol. For example, in UNIX, a program sends and receives TCP/IP messages by opening a socket and reading and writing data to and from the socket. This simplifies program development because the programmer need only worry about manipulating the socket and may rely on the operating system to actually transport messages across the network correctly. Many of the functions provided by SSL are part of a next generation IP protocol (IPng) known as IP version 6 (IPv6), being considered by Internet Engineering Task Force (IETF), which is the main standards organization for the Internet.

IPSec is a set of protocols that support secure exchange of packets at the IP layer. IPSec supports two encryption modes: Transport and Tunnel. At the source device (i.e., transmitting station) of an IP packet, the Transport mode encrypts only the data portion (i.e., payload) of the IP packet, and leaves the header unaffected. The Tunnel mode provides more security than the Transport mode by encrypting both the header and payload of the IP packet. At the destination device (i.e., receiving station), an IPSec-compliant device decrypts received IP packets. Generally, the source and destination devices share a public key. This may be accomplished by implementing a protocol known as Internet Security and Key Management Protocol/Oakley (ISAKMP/Oakley), which allows the destination device to obtain a public key and authenticate the source device using X.509 standard, which is an International Telecommunication Union (ITU) standard for defining digital certificates.

The referenced application describes a broker server configured to manage client transactions and relieve data path congestion in a communication network. For details on the broker operation over a TCP/IP network, reference is made to the referenced application which is incorporated by reference in its entirety herein. When a communication network involves secure operations, management of client transactions requires adaptation to and compliance with the secure operations. The need to speed up client transactions over a secure network is particularly important because a typical Web (World Wide Web) server processes secure transactions at a slower rate than conventional (i.e., non-secure) HTTP traffic. With current technology, Web users who make secure transactions with a Web server have to wait a long time for transactions to be processed and the overall reliability and availability of the Web site are impacted.

Therefore, there is a need in the network communication technology, such as the Internet, to support brokering of client transactions over secure (e.g., SSL) communication networks. The invention should eliminate server performance bottlenecks during secure SSL transactions.

SUMMARY OF THE INVENTION

In one embodiment, the invention provides a server computer configured to manage transactions over a communication network. The server computer comprises a data interface operably connected to and configured to receive a data packet from a computer over a secure link of the communication network. The server computer further comprises a data processor operably connected to the data interface and programmed to access the received data packet. The processor is further programmed to decrypt contents of the data packet and re-direct the data packet to another computer. The server computer further comprises a data storage operably connected to the processor and the data interface. The data storage is configured to store the data packet until the other computer becomes ready to receive the client packet.

In another embodiment, the invention provides a system configured to respond to electronic requests over a computer network. The system comprises a first server configured to interface with and receive a data packet over a secure link of the computer network. The first server is further configured to decrypt contents of the data packet and re-direct the data packet. The system further comprises a second server in data communication with the first server and configured to accept the data packet from the first server and execute the data packet pursuant to instructions contained therein.

In another embodiment, the invention provides a method of managing electronic requests in a computer network. The method comprises receiving a data packet having encrypted information from a client computer over a secure link of the computer network. The method further comprises decrypting the information of the received data packet. The method further comprises establishing a link with a server that is available to execute the data packet. The method further comprises sending the data packet to the server.

BRIEF DESCRIPTION OF THE DRAWINGS

The above and other aspects, features and advantages of the invention will be better understood by referring to the following detailed description, which should be read in conjunction with the accompanying drawings, in which:

FIG. 3 is a flowchart describing the operation of the broker of FIG. 1.

FIG. 4 is a flowchart describing the operation of the server of FIG. 1.

DETAILED DESCRIPTION OF THE INVENTION

The following description is not to be taken in a limiting sense, but is made merely for the purpose of describing the general principles of the invention. The scope of the invention should be determined with reference to the claims.

Figure 1:
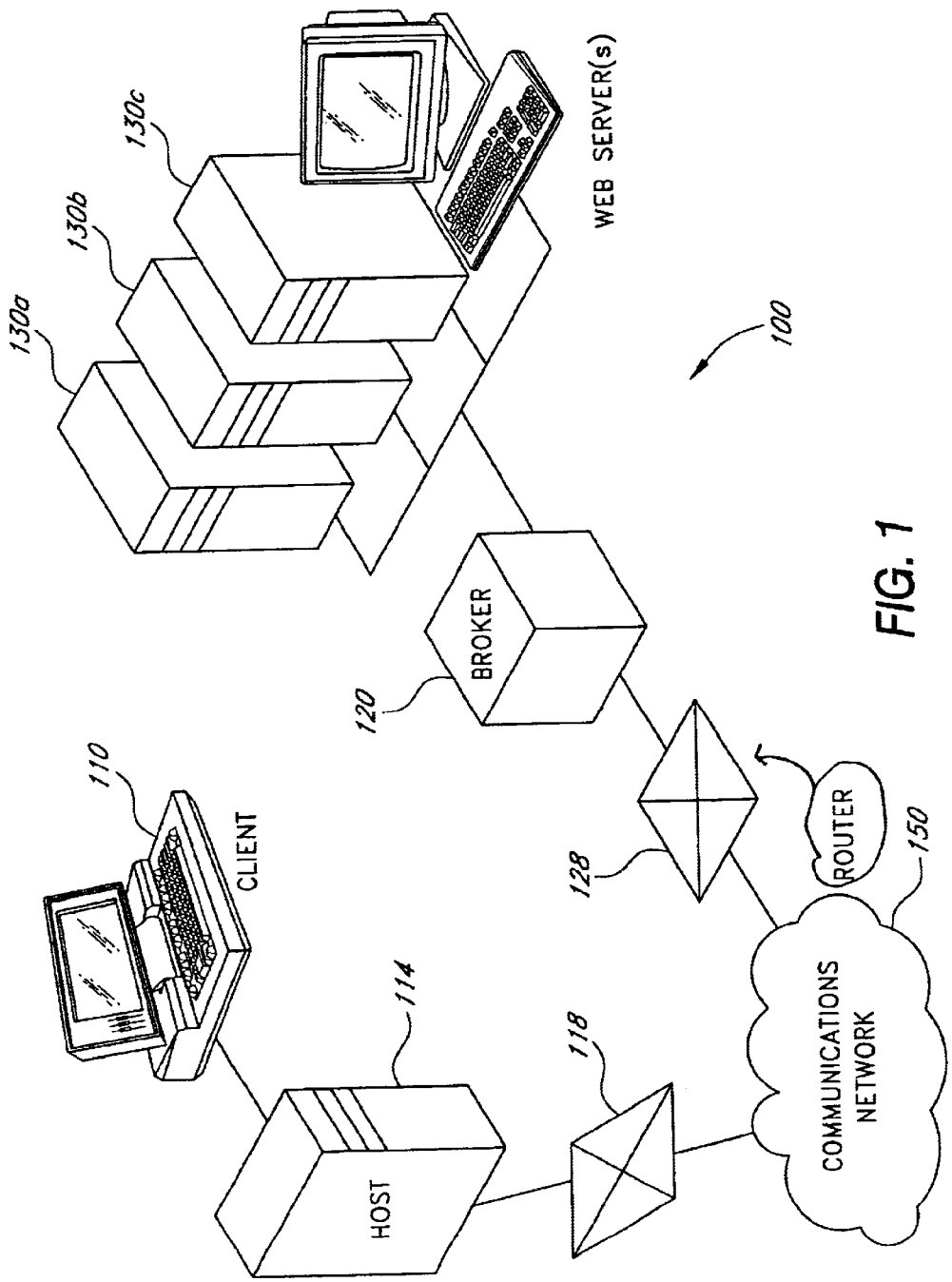
FIG. 1 is a functional block diagram of a client-server network in accordance with the invention.

FIG. 1 is a functional block diagram of a client-server system 100 in accordance with the invention. As shown in FIG. 1, the system 100 comprises one or more clients 110 configured to communicate with a server 130a over one or more communication networks 150, generally a packet switched network such as the Internet. The client 110 may connect to the network 150 via a host server 114, e.g., the server computer controlled by an Internet Service Provider (ISP), that is operationally connected to the network 150 via a bridge-type device, such as a router 118. The router 118 is configured to forward packets received from the client 110 to various destinations based on packet header information, such as the destination address. The Internet physical layer makes extensive use of routers to forward packets from one server (e.g., host 114) to another (e.g., server 130a).

Typically, the system 100 comprises a plurality of servers 130a, 130b, and 130c. The system 100 further comprises a broker 120 operationally connected between the one or more servers (130a, 130b, and 130c) and a router 128. The broker 120 manages and responds to client transactions by handing off client transactions to one of the servers 130a, 130b, and 130c, as fully described in the referenced application.

Typically, the communication network 150 conforms to one or more standard communication protocols, such as the TCP/IP protocols. Although only one client 110 is shown in FIG. 1, the system 100 operates with multiple clients simultaneously. Similarly, although only one broker 120 is shown in FIG. 1, the system 100 may operate with multiple brokers simultaneously, such as in a cascaded structure wherein two or more brokers are connected in parallel between the router 120 and a plurality of sets of servers (not shown in this figure).

The broker 120 is configured to support several SSL links and, in one embodiment, the broker 120 may support up to 600 SSL links or transactions per second. Communication between the broker 120 and multiple clients is typically provided by the characteristics of the communication protocol. For example, using the TCP/IP protocol, the broker 120 may simply monitor the destination address of packets flowing over the network. If a destination address matches a desired address (e.g., address of one of the plurality of servers that the broker 120 is servicing), then the broker 120 receives the packet for further processing. Typically, the broker 120 applies this method irrespective of the source address (i.e., client identity) of packets.

Communications over the network 150 may include transmission and reception of secure data between the client 110 and broker 120. As noted above, the network 150 may implement TCP/IP protocols (such as the Internet) and apply one or more security protocols, such as SSL, IPSec, or others. In this invention, the SSL protocol will be described to illustrate the practice of the invention. However, it will be understood from this disclosure by those having ordinary skill in the art that the invention may be implemented using any one or more security protocols.

When communication between the client 110 and broker 120 (which is a proxy for the intended recipient server 130) is desired, the client 110 initiates a "handshake" as specified by the communication protocol, e.g., TCP/IP. For example, the client 110 transmits a packet having a set SYN bit from the client 110 to the broker 120. The broker 120 responds to the client 110 by transmitting a packet having a set ACK bit, and the client 110 acknowledges the acknowledgement of the broker 120 by transmitting a packet having a set ACK bit. In addition to establishing a handshake pursuant to the network protocol, performing a handshake in accordance with the specification of the secure protocol (e.g., SSL) may be required.

Figure 2:
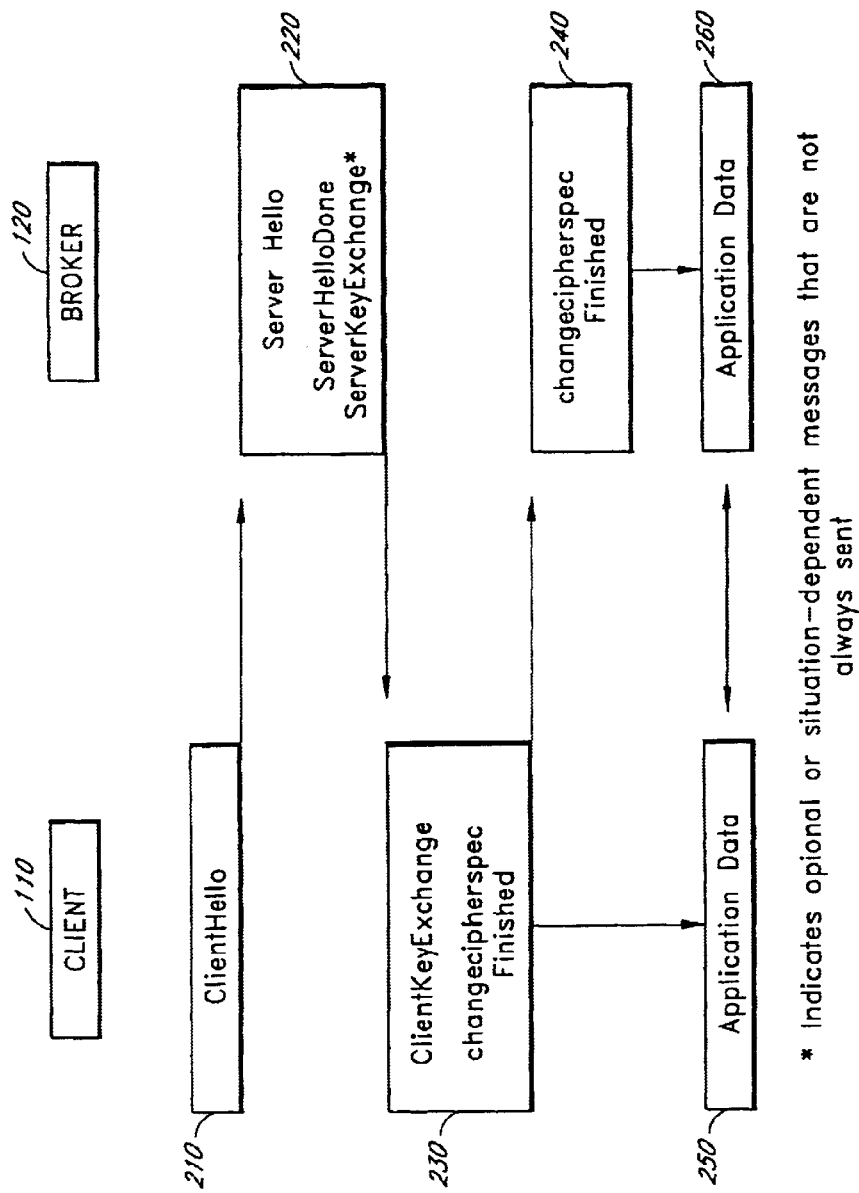
FIG. 2 is a flowchart describing a handshake operation pursuant to the SSL protocol standard.

When a client and server wish to communicate using a SSL connection, they exchange information about a protocol version, select cryptographic algorithms, authenticate each other, and use public-key encryption techniques to generate shared secrets. These processes are handled by the handshake protocol of the SSL connection, which may be summarized as follows. FIG. 2 is a flowchart describing a handshake operation pursuant to the SSL protocol. To establish a SSL connection or link, the client 110 initiates a handshake by sending a ClientHello message to the broker 120 (block 210).

The ClientHello message communicates several client attributes, including protocol version, session identification (ID), ciphering algorithm, and compression method. In the ciphering algorithm field, the client 110 includes a list of cipher suites that are supported by the client 110 with the client's first preference listed first. For example, the structure of the ClientHello message may include the following command: CipherSuite cipher_suites<list>, where "list" represents one or more ciphering protocols supported by the Client 110. The session ID is generally a random value generated by the client 110 to identify the session to the broker 120. The client attributes provide the broker 120 with the link specification supported by the client 110. The broker 120 responds to the client 110 by sending a ServerHello message, which includes similar attribute information about the broker 120 (block 220). If the client 110 desires authentication of the broker 120 before communicating application data, the broker 120 sends a server certificate to the client 110. The type of ciphering algorithm communicated by the client 110 (in its ClientHello message) indicates whether authentication of the broker 120 is desired. The structure of the server certificate depends on the selected ciphering algorithm, and in one embodiment is generally an X.509.v3 digital certificate.

The broker 120 supports several ciphering or security algorithms. The ciphering algorithms may include RSA, DSA, Diffie-Hellman PKIs, RC2, RC4, RC5, DES, Triple DES, IDEA, CAST, CASTS, Blowfish, MD5, MDC2, RMD-160, SHA, and/or SHA-1. It is worth noting, however, that the kind of ciphering algorithm used is not necessarily material to practicing the invention. The client 110 and broker 120 may negotiate and agree to any mutually available ciphering algorithm. In the event that the client 110 does not support a ciphering protocol that is recognized by the broker 120, the SSL session may not be established. In the event of a failure of the client 110 during an established SSL session, the broker 120 times-out after a predetermined duration of no response from the client 110 and terminates the session.

Following the hello messages, the broker 120 may send a server key exchange message to the client 110, if required by the ciphering algorithm. For example, the key exchange message may be used when the broker 120 does not have a certificate, or has a certificate that is used for sign-on (i.e., initial connection) only. The broker 120 sends the Server-HelloDone message to the client 110 to indicate that the hello phase of the handshake is complete (block 220). The broker 120 then waits for a client response. The client sends a ClientKeyExchange to the broker 120. The content of the ClientKeyExchange depends on the public key algorithm established during the Hello phase of the handshake. For example, if a Fortezza key exchange is selected, the ClientKeyExchange specifies a selection of the Fortezza key exchange algorithm (KEA) to the broker 120. Generally, the public key algorithm uses two keys: a public key and a private key. Messages encrypted with the public key may only be decrypted with the associated private key. Conversely, messages encrypted with the private key may only be decrypted with the public key. The client 110 then sends a ChangeCipherSpec message to the broker 120 to activate a selected ciphering algorithm, such as RSA, Fortezza, or Client Diffie-Hellman (bock 230). The ChangeCipherSpec message comprises a single byte of value 1, which is encrypted and compressed and serves to notify the recipient (e.g., broker 120) that subsequent data will be protected under the just-negotiated ciphering algorithm and keys. Finally, the client 110 sends a Finished message to the broker 120 to verify that the key exchange and authentication processes were successful. The Finished message is typically encrypted with the just-negotiated ciphering algorithm (block 230). Upon receiving the client Finished message, the broker 120 updates its ciphering algorithm to the one selected by the client 110, and confirms by sending a ChangeCipherSpec message to the client 110 (block 240). The broker 120 also sends a Finished message to the client 110 in an encrypted form using the just-negotiated ciphering algorithm. At this stage, the handshake is complete and the client 110 and broker 120 may begin to exchange application data in encrypted form (blocks 250 and 260).

FIG. 3 is a flowchart describing the operation of the broker 120. After the client 110 and broker 120 establish a SSL connection and commence exchanging application data, the broker 120 may selectively execute one of two embodiments of the data exchange between the broker 120 and the server 130a. In both embodiments, it is desirable to have the broker 120 buffer the incoming application data from the client 110 until a handshake can be used to establish a data transport connection between the broker 120 and server 130a (block 310). By buffering the data, the broker 120 ensures that application data sent by the client 110 to the broker 120 are protected from loss. It is desirable to have the broker 120 dynamically allocate the buffer size (e.g., as random access memory or RAM) in response to traffic volume between clients and servers. More particularly, the broker 120 may adjust (i.e., increase or decrease) a preset buffer size to optimize availability of buffer for handling client requests. For example, in one embodiment, the broker 120 may continuously monitor its percentage of use of the allocated buffer space. If the percentage of use is below a preselected threshold level (e.g., 40%), the broker 120 may downsize its buffer space by a preselected factor (e.g., ½). If, on the other hand, the percentage of use is over a preselected threshold level (e.g., 95%), the broker 120 may increase its buffer space by a preselected factor (e.g., 2). Ultimately, the allocated buffer space may reach a maximum memory space, beyond which the broker 120 may not exceed due to memory limitations dictated by its hardware specification.

Generally, the broker 120 may include at least a processor and a storage unit to manage and store the client data in accordance with the invention. More particularly, the broker 120 may be embodied, for example, in commercial form as a Commerce Accelerator 1000 or Commerce Director 8000, manufactured by Ipivot, Inc.

In one embodiment, and particularly if relaxed secure measures are sufficient, the broker 120 is configured to establish a hand-off link with the server 130a to fulfill or execute client transactions, as described in the referenced application. The hand-off link does not involve encryption/decryption of messages between the broker 120 and server 130a. In another embodiment, and particularly where greater security is desired, the broker 120 is configured to establish a secure (e.g., SSL) hand-off link with the server 130a to fulfill or execute client transactions. Generally, the system operator determines which configuration settings (e.g., the Basic Input/Output System or BIOS settings) to program in the broker 120 at the time of initial system installation. A typical BIOS setting for this feature may be represented by <Continue Secure Link: Y/N>. Alternatively, the broker settings may be selected by the system user during operation or automatically adjusted to accommodate various server configurations. Based on these settings, the broker 120 determines as to whether to continue a secure (e.g., SSL) or a non-secure link (block 320).

If the broker 120 is configured to continue a secure link, then the operation of the broker 120 proceeds to (block 330). As described in the referenced application, there are a number of servers which the broker 120 may use for hand-off to fulfill the client's transaction request. Accordingly, the process described herein assumes that the broker 120 has selected a fulfillment server, e.g., the server 130a from the servers 130a, 130b, and 130c for handing off client transactions. In handing off a client transaction, the broker 120 decrypts the packets received from the client 110 by applying the ciphering algorithm agreed upon with the client 110 (block 330). After decryption, the broker 120 modifies the packet header information, such as the destination address, to reroute client packets to the server 130*a* (block 332).

To reroute client packets to the server 130*a*, the broker 120 initiates a secure SSL handshake with the server 130*a* (block 334) in a manner that is substantially similar to the handshake establishment between the client 110 and broker 120, described above. After the handshake is established between the broker 120 and server 130*a*, the broker 120 and server 130*a* are now ready to exchange application data in encrypted form. Accordingly, the broker 120 retrieves client packets from its buffer and encrypts the client packets for transmission to the server 130*a* (block 336). After encryption, the broker 120 sends encrypted client packets to the server 130*a* for execution. At this stage of the process, handing off the client transactions from the broker 120 to the server 130*a* is complete (block 350).

On the other hand, if the broker 120 is configured to continue in a non-secure mode, the operation of the broker 120 proceeds to (block 340). By continuing the link in a non-secure mode, the broker 120 may achieve a significant operational advantage. The advantage provides for relieving the server 130*a* from CPU-intensive tasks that involve SSL operations (i.e., encryption/decryption). In effect, the broker 120 takes over the server's SSL operations thereby freeing up the CPU of the server 130*a* to perform other pending tasks. Some broker operations may show improvements in response speed to a client by up to 50 times. The broker 120 is typically equipped with one or more processors that are dedicated to cryptographic applications. In contrast, servers are generally equipped with general application central processing units that are responsible for numerous non-cryptographic applications. Hence, by relocating cryptographic functions from the server 130*a* to the dedicated processor of the broker 120, the response speed to the client is greatly enhanced.

As noted in the 330 branch of the broker operation, the broker 120 decrypts client packets by applying the ciphering algorithm agreed upon with the client 110 (block 340). After decryption, the broker 120 modifies the packet header information, such as the destination address, to reroute client packets to the server 130*a* (block 342). To reroute client packets to the server 130*a*, the broker 120 initiates a conventional (i.e., non-secure) handshake with the server 130*a* in accordance with the communication protocol (e.g., TCP/IP) specified between the broker 120 and server 130*a* (block 344), as described in the referenced application. After the handshake is established between the broker 120 and server 130*a*, the broker 120 and server 130*a* are ready to exchange application data in conventional form. Accordingly, the broker 120 retrieves and sends the client packets to the server 130*a* (block 346). At this stage of the process, handing off the client transactions from the broker 120 to the server 130*a* is complete (block 350).

FIG. 4 is a flowchart describing the operation of a third-party server, e.g., the server 130*a*. As discussed above with respect to FIG. 3, the client 110 and broker 120 establish a SSL connection and commence exchanging application data. The server 130*a* may selectively execute one or two modes of the data exchange between the broker 120 and the server 130. The control flow begins at block 400, where the server awaits the opening of a new connection with the broker 120. The broker 120 initiates the handshake with the server 130*a* and a connection is established at block 410. As noted above, the server 130 may be configured a prior mode decision to communicate via a standard link or a secure link with the broker 120. If the handshake is requested to be secure, a control flow follows from the decision block 420. In the secure link mode, the server 130 receives client packets from the broker 120 (block 430). At block 432, the server 130 decrypts the client packets which have been received. The server 130 then fulfills the client's request by executing a client transaction at block 434. The request may be to read a web page, make an e-commerce purchase, communicate with another client via chat, etc. The server 130 next encrypts the response packets for transmission back to the client 110 (block 436). The server 130 sends the encrypted packets to the broker 120 (block 438) and the broker 120 forwards the response packets to the client 110 (block 450). The link may be terminated or additional transactions may be satisfied by the server 130 before the control flow ends (block 460).

An alternate path of packet transmission may occur if the handshake is not requested to be secure by the broker 120 with the server 130 (block 420). In this flow, the server 130 receives client packets from the broker 120 (block 440). The server 130 will execute client transactions (block 442) similarly to what was shown in the secure path at block 434. The server 130 sends response packets to the broker 120 (block 444), which forwards the response packets to the client 110 (block 450).

In the event the server 130 encounters unexpected congestion, operational errors, or a sudden breakdown, during the processing of client packets, the server 130 typically sends one or more error messages, such as HTTP 400, 500, or 600 series error messages. It is desirable to have the broker 120 monitor such error messages to determine if any error message is generated by the server 130. In the server 130 generates such an error, the broker 120 responds by transparently (i.e., without the client's awareness) re-direct client packets to another server for fulfillment. In that case, the client session may be recovered and completed without conveying any of the service difficulties encountered by the entity providing the service to the client. Accordingly, customer perception of the servicing entity (e.g., e-commerce vendor) is maintained high.

In another embodiment, the broker 120 allows system administrators to identify one or more groups of users for the purpose of prioritizing user transactions. More particularly, the system administrator may select a group of users having a particular source address to set a priority level (e.g., 1 through 5) therefore. The broker 120 allocates the least amount of response time to process transactions issued by the user group having highest priority (e.g., 5). By allocating the least amount of response time (e.g., a threshold of 10 milliseconds), the broker 120 monitors a server's response time to high-priority transactions. In the event one or more response times are greater than the threshold time, the broker 120 may reduce the flow of non-secure transaction traffic (e.g., plain HTTP) to the server 130. By reducing the flow of non-secure traffic to the server 130, the broker 120 frees up the server 130 to transact secure transactions (e.g., HTTPS) more efficiently. In practice, it is believed that secure transactions are more likely to involve financial data (i.e., e-commerce applications) than non-secure transactions. Thus, the broker 120 reduces the flow of non-secure traffic in an effort to maximize e-commerce related transactions. Additionally, the broker 120 may re-direct traffic to another server that may fulfill client requests most efficiently.

On the other hand, for client transactions having a lowest priority, the broker 120 allocates a maximum amount of response time (e.g., a threshold of 50 milliseconds) for monitoring. In accordance with the threshold time, the broker 120 may intervene in a manner that is similar to the description of high priority transactions above. Accordingly, after a given threshold time of non-response, the broker 120 may reduce the flow of non-secure transactions to the server 130, or re-direct client packets to another server for more efficient fulfillment. In any case, for a particular group of users, the broker 120 aims to dedicate server resources that are commensurate with the group's anticipated or targeted interest.

In view of the foregoing, it will be appreciated that the invention overcomes the long-standing need for a broker that manages network transactions between a client and a server over secure links, such as SSL. The invention may be embodied in other specific forms without departing from its spirit or essential characteristics. The described embodiments are to be considered in all respects only illustrative and not restrictive. The scope of the invention is, therefore, indicated by the appended claims rather by the foregoing description. All changes falling within the meaning and range of equivalency of the claims are to be embraced within their scope.

What is claimed is:

1. A server computer configured to manage transactions over a communication network, the server computer comprising:
   a data interface operably connected to and configured to receive a data packet from a computer over a secure link of the communication network;
   a data processor operably connected to the data interface and programmed to access the received data packet, decrypt contents of the data packet, make a selection regarding one of a plurality of other computers in which to send the data packet, and re-direct the data packet to the selected one of the plurality of other computers; and
   a data storage operably connected to the processor and the data interface, the data storage configured to store the data packet until the selected other computer becomes ready to receive the client packet, wherein the data processor selects the one of the plurality of other computers based on a response time of each of the plurality of other computers.

2. The server of claim 1, wherein the data interface is configured to receive the data packet having encrypted information over a secure socket layer (SSL) link.

3. The server of claim 1, wherein the processor is programmed to re-direct the data packet having unencrypted information over a non-secure link to the selected other computer.

4. The server of claim 1, wherein the processor is programmed to re-direct the data packet having encrypted information over another secure link to the selected other computer.

5. A server computer configured to manage transactions over a communication network, the server computer comprising:
   a data interface operably connected to and configured to receive a data packet from a computer over a secure link of the communication network;
   a data processor operably connected to the data interface and programmed to access the received data packet, decrypt contents of the data packet, make a selection regarding one of a plurality of other computers in which to send the data packet, and re-direct the data packet to the selected one of the plurality of other computers; and
   a data storage operably connected to the processor and the data interface, the data storage configured to store the data packet until the selected other computer becomes ready to receive the client packet, wherein the processor is programmed to monitor and compare a response time of the selected other computer to a threshold time.

6. The server of claim 5, wherein the processor is further programmed to reduce the flow of non-secure traffic to the selected other computer in the event that the response time exceeds the threshold time.

7. A server computer configured to manage transactions over a communication network, the server computer comprising:
   a data interface operably connected to and configured to receive a data packet from a computer over a secure link of the communication network;
   a data processor operably connected to the data interface and programmed to access the received data packet, decrypt contents of the data packet, make a selection regarding one of a plurality of other computers in which to send the data packet, and re-direct the data packet to the selected one of the plurality of other computers; and
   a data storage operably connected to the processor and the data interface, the data storage configured to store the data packet until the selected other computer becomes ready to receive the client packet, wherein the data storage is configured to adjust the size of available space in response to a change in the number of received data packets.

8. A system configured to respond to electronic requests over a computer network, the system comprising:
   a first server configured to interface with and receive a data packet over a secure link of the computer network, the first server further configured to decrypt contents of the data packet, make a selection regarding one of a plurality of other servers in which to send the data packet and re-direct the data packet to the selected other server, the first server selects the one of the plurality of other servers based on a response time of each of the plurality of other servers; and
   a second server, serving as the selected other server, in data communication with the first server and configured to accept the data packet from the first server and execute the data packet pursuant to instructions contained therein.

9. The system of claim 8, wherein the first server is configured to interface with a secure socket layer (SSL) link of the computer network.

10. The system of claim 8, wherein the first server is configured to re-encrypt contents of the data packet.

11. The system of claim 8, wherein the first server is configured to establish a secure link with the second server for transmission of data packets therebetween.

12. The system of claim 11, wherein the second server is configured to decrypt data packets received from the first server.

13. The system of claim 8, wherein the second server is configured to send at least one data packet in response to the received data packet within a response time.

14. A system configured to respond to electronic requests over a computer network, the system comprising:
   a first server configured to interface with and receive a data packet over a secure link of the computer network, the first server further configured to decrypt contents of the data packet, make a selection regarding one of a plurality of other servers in which to send the data packet and re-direct the data packet to the selected other server; and a second server, serving as the selected other server, in data communication with the first server and configured to accept the data packet from the first server and execute the data packet pursuant to instructions contained therein, wherein the first server is configured to monitor the response time of the second server and compare the response time to a threshold time.

15. The system of claim 14, wherein the first server is configured to reduce the volume of non-secure traffic flow in the event that the response time exceeds the threshold time.

16. The system of claim 8, wherein the first server is configured to monitor a response of the second server and, in the event of an error in the second server, re-direct the client packet to another server for fulfillment.

17. A method of managing electronic requests in a computer network, the method comprising:

receiving a data packet having encrypted information from a client computer over a secure link of the computer network;

decrypting the information of the received data packet;

selecting one of a plurality of servers in which to send the data packet;

establishing a link with the selected server that is available to execute the data packet;

sending the data packet to the selected server; and monitoring a time of response to the client computer and, if the response time exceeds a threshold time, reducing the volume of non-secure traffic to the selected server.

18. The method of claim 17, wherein the receiving includes receiving a data packet over a secure socket layer (SSL) link of the Internet.

19. The method of claim 17, further comprising re-encrypting the information of the data packet prior to sending the data packet to the selected other server.

20. The method of claim 17, further comprising sending a data packet to the client computer in response to the data packet of the client computer.

21. The method of claim 17, further comprising setting a threshold time for each of the plurality of other servers, the threshold time being based on the priority of response to the plurality of other servers.

22. The method of claim 17, wherein establishing a link includes setting up another secure link with the selected other server.

23. The method of claim 17, further comprising receiving the data packet by the selected other server and preparing at least one data packet in the course of an e-commerce transaction.

24. The method of claim 17, further comprising decrypting the information of the data packet by the selected other server.

25. The method of claim 17, further comprising monitoring a response of the selected other server and, in the event of an error in the selected other server, re-directing the data packet to another server of the plurality of servers.

26. A method of communicating between a client and a server in a clientserver network, the method comprising:

establishing a communication link between the client and a first server;

receiving by the first server at least one packet from the client, the packet representing a data request;

selecting one of a plurality of other servers in which to send the data packet;

modifying header information of the packet at the first server;

sending the modified packet from the first server to the selected other server, the selected other server comprising a second server;

responding to the data request of the client via the first server; and monitoring a time of response to the client and, if the response time exceeds a threshold time, reducing the volume of non-secure traffic to the selected other server.

27. The method as defined in claim 26, wherein establishing a communication link includes, performing at least one handshake between the client and the first server.

28. The method as defined in claim 27, wherein the performing at least one handshake comprises beginning a transport control protocol/internet protocol (TCP/IP) session.

29. The method as defined in claim 26, wherein modifying header information includes modifying a destination address of the packet to route the packet to the second server.

30. The method as defined in claim 26, wherein sending the modified packet to the second server includes sending the packet over a non-secure link.

31. The method as defined in claim 26, wherein responding to the client includes sending by the second server at least one response packet to the first server.

32. The method as defined in claim 31, wherein responding to the client further includes sending by the first server response packet with a destination address of the client.

33. A system for communicating between a client and a client-server network, the system comprising:

a first server that is configured to receive at least one packet from the client, the packet representing a data request, the first server further configured to make a selection regarding one of a plurality of other servers in which to send the data packet, modify header information of and send the modified packet via the network, the server being programmed to monitor and compare a response time of the selected other server to a threshold time; and a second server, serving as the selected other server, that is configured to receive modified packet and respond to the data request of the client via the first sever.

34. The system as defined in claim 33, wherein the first server is configured to perform at least one handshake with the client.

35. The system as defined in claim 34, wherein the handshake represents a start of a transport control protocol/internet protocol (TCP/IP) session.

36. The system as defined in claim 33 wherein the first server is configured to modify a destination address of the packet so as to route the packet to the second server.

37. The system as defined in claim 33, wherein the first server is configured to send the packet to the second server over a non-secure link.

38. The system as defined in claim 33, wherein the second server is configured to send at least one response packet to the first server.

39. The system as defined in claim 38, wherein the first server is configured to send the response packet with a destination address of the client.

40. The server computer of claim 1, wherein the data processor is further configured to re-direct data packets to another one of the plurality of computers in the event of an error in the selected one computer.

41. The server computer of claim 40, wherein the re-direction of the data packets is transparent to a client computer that sends the data packet over the secure link at the communications network.

42. The system of claim 8, wherein the first server re-directs data packets to another one of the plurality of servers in the event of an error in the selected one server.

43. The system of claim 42, wherein the first server re-directs the data packets is transparent to a client computer that sends the data packet over the secure link of the communications network.

\* \* \* \* \*

UNITED STATES PATENT AND TRADEMARK OFFICE
CERTIFICATE OF CORRECTION

PATENT NO. : 6,681,327 B1
DATED : January 20, 2004
INVENTOR(S) : Cary A. Jardin

It is certified that error appears in the above-identified patent and that said Letters Patent is hereby corrected as shown below:

Column 11
Line 67, change "clientserver" to -- client-server --.

Column 12,
Line 49, change "the server" to -- the first server --.

Signed and Sealed this

Seventh Day of September, 2004

JON W. DUDAS
*Director of the United States Patent and Trademark Office*